AUTOMATIC SHUTTER TIMING NETWORK

Filed July 6, 1965

INVENTORS
MASATERU YOSHIDA
TADAMICHI MORI
BY Stanley Wolder
ATTORNEY

United States Patent Office 3,429,242
Patented Feb. 25, 1969

3,429,242
AUTOMATIC SHUTTER TIMING NETWORK

Masateru Yoshida and Tadamichi Mori, Kitatama-gun, Tokyo-to, Japan, assignors to Citizen Tokei Kabushiki Kaisha, Shinjuku, Tokyo-to, Japan, a corporation of Japan Filed July 6, 1965, Ser. No. 469,639
Claims priority, application Japan, July 7, 1964, 39/53,566
U.S. Cl. 95—10 3 Claims
Int. Cl. G01j *1/52;* G03b *7/08*

ABSTRACT OF THE DISCLOSURE

A camera automatic shutter includes a shutter closing switching network controlled by a timing network comprising a photoconductor, a first resistor and a capacitor connected in series and a second resistor connected through a switch across the capacitor, the capacitor being connected to the switching network control input. The photoconductor is non-linear in the high illumination range and the first and second resistor are of such values as to compensate for such non-linearity.

The present invention relates generally to improvements in automatic exposure cameras and relates more particularly to an improved light responsive timing network for automatically controlling the speed or exposure time of a camera shutter.

Various arrangements have been employed and proposed for automatically controlling the exposure of a camera in response to the prevailing or incident light conditions. The mechanism commonly in use employs an ammeter type of movement which is connected either to a photovoltaic cell or through a photoconductor to a battery, the photoconductor or photocell being directed toward the object being photographed. The ammeter movement mechanically controls the camera diaphragm or the camera shutter speed or both. By reason of the mechanical nature of the aforesaid arrangement and for other reasons, such arrangement is unreliable, lacking in accuracy, unstable, of low durability and otherwise leaves much to be desired. Many of the drawbacks of the above system are overcome by an automatic exposure camera mechanism which has been previously described and which includes an RC timing network the resistance element of which is a photoconductor exposed to the camera incident light. A voltage is applied across the timing network and the voltage across the capacitor is applied to the input of an electronic switch the output of which controls the closing of the camera shutter by way of a solenoid actuated armature, the changing sequence being initiated with the opening of the shutter. While the latter control system possesses many desirable features it possesses an important disadvantage in that it is not uniformly accurate over the full illumination range by reason of the inherent non-linear light response of the photoconductor over the full range of illumination.

It is therefore a principal object of the present invention to provide an improved automatic exposure camera.

Another object of the present invention is to provide an improved network for automatically controlling the shutter speed of a camera in response to the incident light.

Still another object of the present invention is to provide an improved automatic timing network for camera shutters which is accurate over a wide range of illumination.

A further object of the present invention is to provide an automatic exposure system of the above nature characterized by its reliability, ruggedness, accuracy and flexibility.

The above and other objects of the present invention will become apparent from a reading of the following description taken in conjunction with the accompanying drawings, wherein.

In a sense the present invention contemplates the provision of an automatic exposure camera including switching means responsive to a predetermined input signal for controlling the camera shutter speed, a timing network comprising a photoconductor and a first resistor and a timing capacitor connected in series, and a second resistor connected across said capacitor means for applying a voltage across said timing network, and means coupling said timing network to said switching means input whereby the signal thereto is responsive to the charge in said capacitor. The second resistor is connected across the capacitor through a switch.

Figure 1:
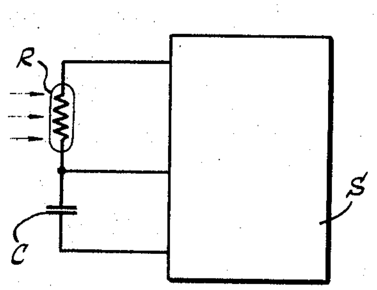
FIGURE 1 is a schematic diagram of the automatic exposure control circuit of the photographic shutter utilizing a photoconductive element and of known construction.

As seen in FIGURE 1, the general automatic shutter timing network of the present type includes a photoconductor R which is directed toward the object being photographed and is connected in series with a timing capacitor C, a suitable voltage source being connected across the RC timing network through a suitable switching arrangement. The capacitor C is connected to the input control terminals of an electronic switch S whereby to actuate the switch S when the capacitor C of the integrating RC network reaches a predetermined switch triggering voltage. The switch S controls the energization of an electromagnetic device which effects the closing of the camera shutter after a time interval controlled by the resistance of the photoconductor R which responds to the light incident thereon whereby to automatically control the shutter exposure time.

However, in the operation of the above system, with the capacitance value of the capacitor C remaining constant, the time delay, i.e. the exposure time T is proportional to the resistance value of the photoconductive element R. Further, for proper exposure it is necessary that the exposure time T be inversely proportional to the object brightness B. Accordingly, it is desirable that the resistance value of the photoconductive element R be inversely proportional to the object brightness B, that is, the resistance value $r$ of the photoconductive element R be inversely proportional to the illumination L of the surface of the photoconductive element, in other words, $r$ be proportional to $1/L$.

Figure 2:
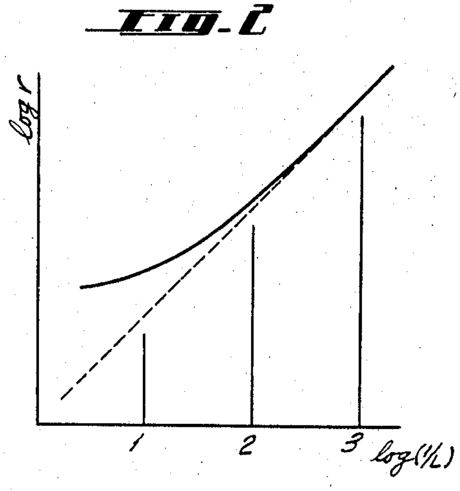
FIGURE 2 is a graph showing the characteristic curve of a cadmium sulfide conductive element.

Generally, however, the resistance value $r$ of the photoconductive element R does not vary linearly in response to variations of the illumination L within a wide range, that is, $r$ is not proportional to $1/L$. For example, as shown in FIGURE 2 showing the characteristic curve of a cadmium sulfide photoconductive element with the horizontal coordinate log $(1/L)$ and the vertical coordinate log $r$, in the low illumination range, i.e. in the vicinity of horizontal coordinate 3, the curve almost coincides with the dotted line indicating the proportional relation, while, as the illumination gets higher, the proportionality is gradually lowered, this condition being particularly noticeable in the high illumination range, that is, the range of horizontal coordinate 1–2. Thus, when the illumination of the object is so high that the range of the illumination L of the surface of the photoconductive element R corresponds to the range of horizontal coordinate 1–2, it is necessary that a corresponding compensation be made.

Figure 3:
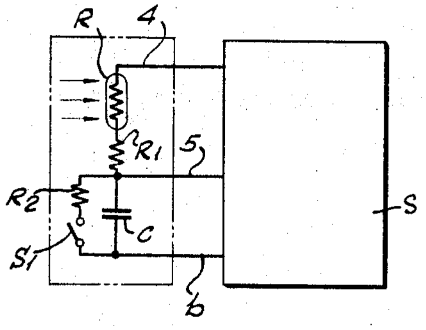
FIGURE 3 is a schematic diagram of a network embodying the present invention.

In accordance with the present invention, the required compensation is effected by a novel electric circuit network wherein, as shown in FIGURE 3, to the integrating RC circuit R–C there are further connected compensating resistors $R_1$ and $R_2$, with the provision of a switch $S_1$. The resistor $R_1$ is connected between and in series with the photoconductor R and the capacitor C and the resistor $R_2$ is connected in series with the switch S, across the capacitor C.

Power source voltage E of such high value is applied across the circuit network including photoconductor R, resistor $R_1$ and capacitor C by way of opposite leads 4 and 6 that the resistance of the switching circuit S across the capacitor C by way of leads 5 and 6 can be ignored. Considering the transient response of the circuit portion enclosed by the dot-and-dash line, if a time delay T is needed from the moment when the switch $S_1$ is opened until the voltage across the capacitor C and the leads 5 and 6 reaches a predetermined value $v$, that is, the exposure time is T, $R_2=nR_1$ and, as an example, $v/E=\frac{1}{2}$, then $$T=c(r+R_1)\log_e 2-\log_e\frac{r+(n+1)R_1}{r+R_1}$$

Accordingly, the condition for compensation is $r>(n-1)R_1$, where $n>1$. If the ratio of $r$ to $R_1$ varies within a predetermined range, the configuration of the curve of the above equation is determined by the value of $n$. Shown in FIG. 4, for example, are curves with $n=1.2$, $n=1.5$, $n=2$.

Figure 4:
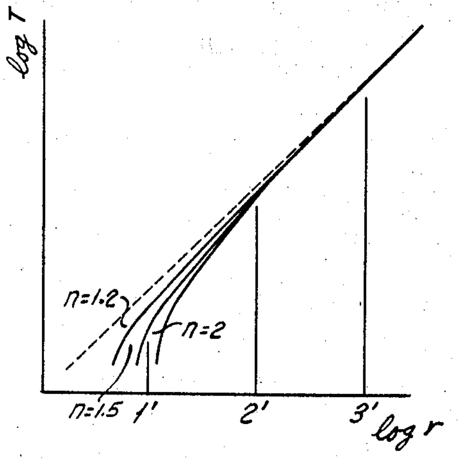
FIGURE 4 is a graph showing the exposure time characteristics according to the improved circuit.

Of further advantage, as can be seen from the above equation, is that, when the values of $R_1$ and $R_2$ are, varied keeping $n$ constant, the curve of FIG. 4 can be parallelly shifted in a transverse direction. Thus a curve with any arbitrary compensation characteristic may be obtained. When the vertical axis of the photoconductor characteristic of FIG. 2 is made to correspond to the transverse axis of FIG. 4 and the corresponding compensation curve is selected, an ideal compensation can be carried out within the range of 1′–2′.

Figure 5:
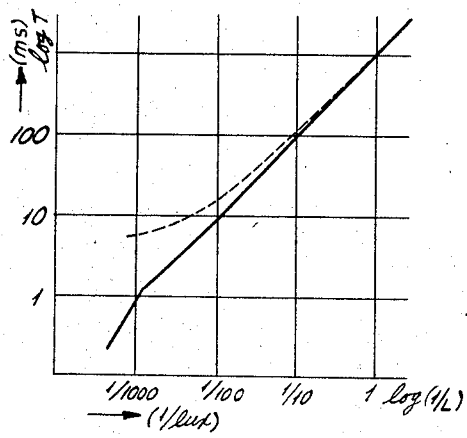
FIGURE 5 is a graph showing the characteristic of a specific embodiment of the present invention.

As a result, compensation can be accomplished through the values of $R_1$ and $R_2$ so as to correspond to the graph of FIG. 2. For example, in FIG. 5 there is shown a graph illustrating the relation between log $(1/L)$ and log T of an example with a commercially available photoconductor R Model 2PT–13, $C=12$ f., $R_1=1K\Omega$, and $R_2=1.2K\Omega$. The dotted line shows the non-compensated condition with time errors 480%, +45%, +20% corresponding to illuminations L 1000, 100, 10 (lux) respectively. The solid line shows a compensated condition with time errors −20%, +10%, +5% corresponding to the same illuminations respectively. As a result, the exposure time is approximately proportional over the entire illumination range, establishing that the solid line characteristic of the circuit of FIG. 1 has been radically improved by a simple inexpensive expedient.

While there has been described and illustrated a preferred embodiment of the present invention it is apparent that numerous alterations, omissions and additions may be made without departure from the spirit thereof.

What is claimed is:

1. In an automatic exposure camera including switching means (S) responsive to a predetermined input signal for controlling the camera shutter speed, a timing network comprising a photoconductor (R), a first resistive circuit element ($R_1$), a timing capacitor (C), said photoconductor, first resistor and timing capacitor being connected in series and adapted to be connected to a voltage source, a switch ($S_1$), a second resistive circuit element ($R_2$) connected in series with said switch ($S_1$), without other circuit elements between the terminals of said capacitor, and means (5, 6) for coupling said timing network to said switching means input whereby the signal thereto is responsive to the charge on said capacitor.

2. In an automatic exposure camera including switching means (S) responsive to a predetermined input signal for controlling the camera shutter speed, a timing network comprising a photoconductor (R) having a nonlinear light response in the high non-linear light response in the high illumination range, a first resistive circuit element ($R_1$), a timing capacitor (C), said photoconductor, first resistive circuit element and timing capacitor being connected in series and adapted to be connected to a voltage source, a switch ($S_1$), a second resistive circuit element ($R_2$) connected without other circuit elements in series with said switch ($S_1$) between the terminals of said capacitor, the resistances of said first and second resistors as related to the resistance characteristic of said photoconductor being such as to compensate for said nonlinear response of said photoconductor.

3. The timing network of claim 2 wherein the resistances of said first and second resistive circuit element are of such values as not to substantially modify the response thereof in the low illumination range.

References Cited

UNITED STATES PATENTS

| | | | |
|---|---|---|---|
| 3,326,103 | 6/1967 | Topaz | 95—10 |
| 3,343,043 | 9/1967 | Ito et al. | 317—124 |
| 3,205,803 | 9/1965 | Burgarella et al. | 95—10 |

NORTON ANSHER, *Primary Examiner.*

ROBERT A. SCHROEDER, *Assistant Examiner.*